June 8, 1926.
T. DE LA MARE
1,587,701
PROCESS FOR REPAIRING WATER PIPES
Filed June 11, 1924
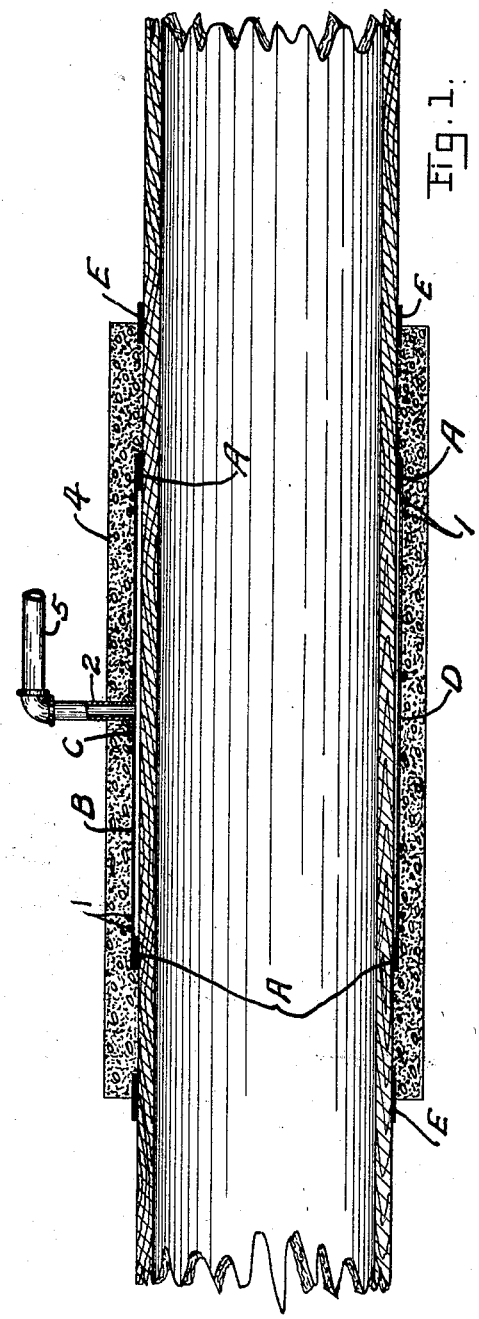
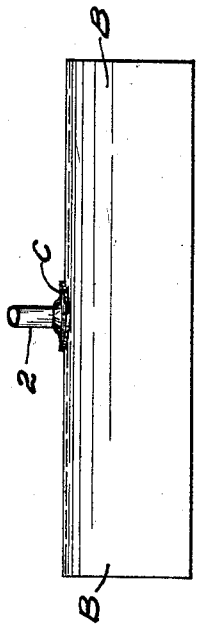
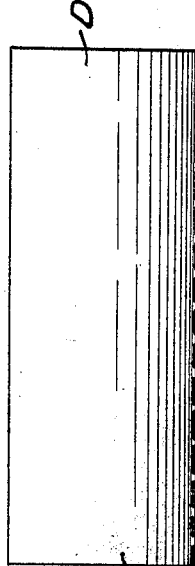
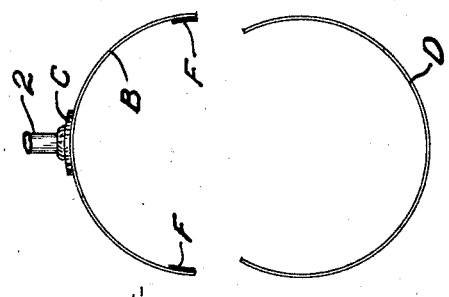
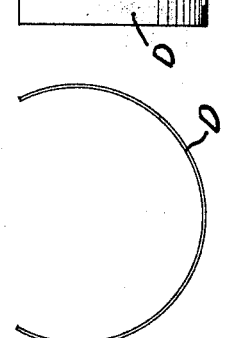
INVENTOR.
Thomas De La Mare
BY
J. M. Thomas
ATTORNEY.

Patented June 8, 1926.

1,587,701

UNITED STATES PATENT OFFICE.

THOMAS DE LA MARE, OF TOOELE, UTAH.

PROCESS FOR REPAIRING WATER PIPES.

Application filed June 11, 1924. Serial No. 719,444.

My invention relates to conduits or pipes and has for its object to provide a process whereby a pipe may be repaired and preserved while in use and carrying liquid under a flow pressure.

These objects I accomplish with my process which may be carried out with the apparatus illustrated in the accompanying drawings, in which I have shown the method of preserving and repairing pipe while in use, and the best apparatus for carrying out the required steps.

In the drawings similar letters and numerals of reference indicate like parts throughout the several views, and the specification describes the apparatus and my process for carrying out the invention of preserving and repairing pressure pipe by surrounding said pipe, while it is carrying water or other liquids, with a continuous sleeve of concrete. Figure 1 is a diametrical section of a water pipe with my apparatus in place thereon. Figure 2 is a side view of the upper repair section. Figure 3 is a similar view of the lower repair section. Figure 4 is an end elevation of the upper repair section, and Figure 5 is an end elevation of the lower repair section.

It is frequently desirable to repair a short section or portion of a pipe, and to preserve the other portions of the same pipe, while the pipe is in use and carrying water and other liquids therein under pressure, such as that required to cause the flow of the liquid. Frequently this pressure will be as much as one hundred pounds or more to the square inch. As is well known, water pipes made of wood may rot, and metal pipes may corrode or deteriorate, for only a short distance or length, while other portions have not deteriorated, and also that to surround said pipe with a plastic concrete while the pipe is carrying a flow of water, with the purpose of patching the leaking pipe with concrete, is difficult.

Heretofore such repairs have been expensive, as the use of material, which would not be displaced while sealing the leak, made the use of concrete in a plastic state impossible for the reason that the flow of water through the leak would wash the plastic concrete away before it had time to set, together with any preservative that may have been applied to the pipe which has not decayed.

By the use of my process, the pipe is to be exposed and the parts which have decayed treated with creosote. I then apply a band of plastic cement A around the pipe on both sides of the leak, before in any way trying to stop the flow of water within the pipe or out through the leak. Then place on the under side of the pipe a thin metal sheet D conforming with the size and contour of the pipe, and covering more than one-half of the circumference of the pipe, extending continuously from one of said cement band patches A to the other. I then apply another curved thin metal sheet B of the same length, but not as wide as sheet D around and contiguous the upper side of said pipe. The said metal sheet B has an opening therein large enough to allow the leakage water to pass freely through and away, which opening in the wall of said metal sheet B is reinforced by a threaded disk or plate C which has previously been sealed or soldered on said metal sheet B. I then spread a strip of the plastic cement F along the horizontal and inner edges of said metal sheet B, which strip F will be contiguous the outer face of said sheet D when the sheets B and D are bound on the pipe by the strand of wire 1, thereby completing a thin dam or strip around the leak contiguous the edges of said strip B. This tightening of the said metal sheets will direct all leakage water through said reinforcement plate C and through a threaded nipple 2, which is to be screwed into said plate C, and an elbow on said nipple with another cement pipe 5 therein. Other bands of plastic cement E are then applied around said pipe, each spaced from the said bands A, and I then surround said pipe with an even layer of plastic concrete 4 of the desired thickness and extending from near the middle of one of said bands E to the other. When this concrete has fully set, so that it will withstand the leakage, the said elbow and pipe 5 may be removed from the said nipple 2 and the opening closed by a threaded plug screwed therein, or a cap on said nipple, thereby permanently stopping the flow of leakage water from the pipe. The covering of the pipe with the concrete 4 will prevent further deterioration of the pipe, and by repeating the process and thus covering all or any desired portions of the pipe the entire line of pipe may be preserved and repaired without interrupting its use and the flow of water therethrough.

Having thus described my invention and its operation I desire to secure by Letters Patent and claim:—

1. A process for repairing and preserving pressure pipe while it is in use for carrying liquids, which consists of cleaning the exterior surface of said pipe and applying creosote to the defective portions of the pipe; surrounding said defective parts with a patch of plastic cement; covering said patch and all portions of said pipe, which are within the area of said patch, with a thin sheet of watertight material, which sheet has an opening therein to allow all leakage water to flow through said opening; then binding said sheet tightly around said pipe to direct and force all leakage water through said opening; then surrounding a section of said pipe, adjacent to the said sheet and extending in both directions beyond the ends of said sheet, by a layer of plastic concrete, and when said concrete is set plugging the said leakage opening.

2. A process for repairing and preserving pipe while it is in use for carrying liquids, which consists of cleaning the exterior surface of said pipe and applying creosote to the defective portions of the pipe; surrounding said defective parts with a patch of plastic cement; covering said patch and all portions of said pipe which are within the area of said patch with a thin sheet of watertight material, which sheet has an opening therein to allow all leakage water to flow through said opening; then binding said sheet tightly around said pipe to direct and force all leakage water through said opening; placing other bands of cement around and on said pipe, which bands are spaced from the ends of said patch, and then surrounding a section of said pipe, on which are held the said patch and cement bands, with a layer of plastic concrete while the leakage water is allowed to flow freely through said opening, and when said concrete is set plugging the said leakage opening.

In testimony whereof I have affixed my signature.

THOMAS DE LA MARE.